United States Patent
Karandikar et al.

(10) Patent No.: US 9,430,393 B2
(45) Date of Patent: Aug. 30, 2016

(54) SYSTEM AND METHOD FOR MANAGING CACHE

(71) Applicant: Texas Instruments Incorporated, Dallas, TX (US)

(72) Inventors: Prashant Dinkar Karandikar, Maharashtra (IN); Mihir Mody, Bangalore (IN); Hetul Sanghavi, Bangalore (IN); Vasant Easwaran, Bangalore (IN); Prithvi Y. A. Shankar, Bangalore (IN); Rahul Gulati, Bangalore (IN); Niraj Nandan, Bangalore (IN); Subrangshu Das, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 72 days.

(21) Appl. No.: 14/583,020

(22) Filed: Dec. 24, 2014

(65) Prior Publication Data
US 2015/0339234 A1 Nov. 26, 2015

(30) Foreign Application Priority Data
May 26, 2014 (IN) .......................... 2594/CHE/2014

(51) Int. Cl.
*G06F 12/08* (2016.01)
*G06F 3/06* (2006.01)

(52) U.S. Cl.
CPC ............. *G06F 12/0862* (2013.01); *G06F 3/06* (2013.01); *G06F 12/08* (2013.01); *G06F 12/0888* (2013.01); *G06F 2212/601* (2013.01); *G06F 2212/602* (2013.01)

(58) Field of Classification Search
CPC ........... G06F 12/0862; G06F 12/0888; G06F 2212/601; G06F 2212/602; G06F 3/06; G06F 12/08
See application file for complete search history.

(56) References Cited

U.S. PATENT DOCUMENTS

| | | | | |
|---|---|---|---|---|
| 5,572,660 A | * | 11/1996 | Jones | ................... G06F 11/1076 714/6.12 |
| 2009/0300340 A1 | * | 12/2009 | Chou | .................... G06F 9/3806 712/237 |
| 2014/0108740 A1 | * | 4/2014 | Rafacz | ................ G06F 12/0862 711/137 |

* cited by examiner

*Primary Examiner* — Hiep Nguyen
(74) *Attorney, Agent, or Firm* — Lawrence J. Bassuk; Frank D. Cimino (57) ABSTRACT

A system includes first and second processing components, a qualified based splitter component, a first and second configurable cache element and an arbiter component. The first data processing component generates a first request for a first portion of data at a first location within a memory. The second data processing component generates a second request for a second portion of data at a second location within the memory. The qualifier based splitter component routes the first request and the second request based on a qualifier. The first configurable cache element enables or disables prefetching data within a first region of the memory. The second configurable cache element enables or disables prefetching data within a second region of the memory. The arbiter component routes the first request and the second request to the memory.

20 Claims, 6 Drawing Sheets

SYSTEM AND METHOD FOR MANAGING CACHE

BACKGROUND

A multimedia system-on-chip (SoC) is an integrated circuit that integrates all components of a computer or electronic multimedia system into a single chip. Conventional multimedia SoCs usually include hardware components for image capture, image processing, video compression/decompression, computer vision, graphics, and display processing. SoCs are very common in the mobile electronics market because of their low power consumption.

In conventional multimedia SoCs, each of the hardware components access and compete for limited bandwidth available in the shared main memory, for example a double data rate (DDR) memory. Since each individual hardware component is computationally and memory bandwidth intensive, it is difficult for the SoC to meet various multimedia latency and throughput requirements. This problem will be described with reference to FIGS. 1-4.

Figure 1:
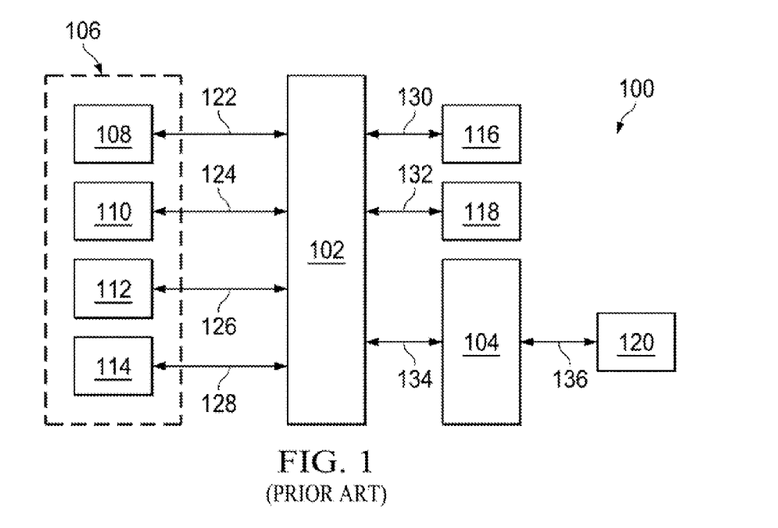
FIG. 1 illustrates a conventional multimedia SoC.

FIG. 1 illustrates a conventional multimedia SoC 100.

As illustrated in the figure, multimedia SoC 100 includes a main system interconnect 102, a secondary interconnect 104, a plurality of processing components 106, a cache 116, a main memory 118, and a peripheral device 120. Plurality of processing components 106 further includes a main CPU 108, an audio component 110, a secondary CPU 112, and a video component 114.

Main system interconnect 102 is operable to act as the main communication bus of multimedia SoC 100. Main system interconnect 102 allows any one of secondary interconnect 104, main CPU 108, audio component 110, secondary CPU 112, video component 114, cache 116, or main memory 118 to communicate or transfer data to any other component connected to main system interconnect 102.

Secondary interconnect 104 is operable to communicate with peripheral device 120, via bi-directional line 122. Secondary interconnect 104 is additionally operable to communicate with main system interconnect 102, via bi-directional line 124.

Main CPU 108 is operable to communicate with all other components of multimedia SoC 100, via hi-directional line 126 and main system interconnect 102. Main CPU 108 is additionally operable to communicate with audio component 110, via bi-directional line 138. Main CPU 108 is yet further operable to process data from cache 116 or main memory 118.

Audio component 110 is operable to communicate with all other components of multimedia SoC 100, via bi-directional line 130 and main system interconnect 102. Audio component 110 is yet further operable to process audio data from cache 116 or main memory 118.

Secondary CPU 112 is operable to communicate with all other components of multimedia SoC 100, via bi-directional line 132 and main system interconnect 102.

Secondary CPU 112 is additionally operable to communicate with video component 114, via bi-directional line 134.

Video component 114 is operable to communicate with all other components of multimedia SoC 100, via bi-directional line 136 and main system interconnect 102. Video component 114 is yet further operable to process video data from cache 116 or main memory 118.

Cache 116 is operable to communicate with all other components of multimedia SoC 100, via bi-directional line 138 and main system interconnect 102. Cache 116 is operable to communicate with main memory 118, via bi-directional line 140. Cache 116 is a system level 3 (L3) memory that is additionally operable to store portions of audio and video data that is stored on main memory 118.

Main memory 118 is operable to communicate with all other components of multimedia SoC 100, via bi-directional line 142 and main system interconnect 102. Main memory 118 is a random access memory (RAM) that is operable to store all audio and video data of multimedia SoC 100.

Peripheral device 120 is operable to communicate with all other components of multimedia SoC 100, via bi-directional line 122 and secondary interconnect 104. Peripheral device 120 is additionally operable to receive an input from a user to instruct conventional SoC 100 to process audio or video data. Peripheral device 120 is yet further operable to display audio or video data.

In conventional multimedia SoCs, each processing component fetches data from the main memory by injecting a unique traffic pattern. For example; an imaging component would predominantly fetch raster data of an image frame, and a codec engine would perform a mix of deterministic and random block level fetching of a video frame. A processing component fetching data in the main memory is a slow process. As more processing components need to fetch data in the main memory, the traffic patterns become more complex, and it becomes increasingly difficult for the SoC to meet all of the latency and throughput requirements for a given use case.

To decrease latency and increase throughput, conventional multimedia SoCs use system level (L3) caching to decrease the number of times data needs to be accessed in the main memory. A cache is small specialized type of memory that is much smaller and faster than the RAM used in a SoCs main memory. A cache is used to store copies of data that is frequently accessed in the main memory. When a processing component of a conventional multimedia SoC needs to access data, it first checks the cache. If the cache contains the requested data (cache hit), the data can quickly be read directly from its location in the cache, eliminating the need to fetch the data in the main memory. If the data is not in the cache (cache miss), the data has to be fetched from the main memory.

When a cache miss occurs, the data that was requested is placed in the cache once it is fetched from the main memory. Since caches are usually quite small, data needs to be evicted from the cache in order to make room for the new data. Generally, a least recently used (LRU) algorithm is used to determine which data should be evicted from the cache. Using a LRU algorithm, the data that has spent the most amount of time in the cache without being accessed is evicted. Once evicted, the data that has been fetched from the main memory from the cache miss is put in its place.

Using an L3 cache does not necessarily decrease latency and increase throughput of a conventional multimedia SoC. Since an SoC has many processing components accessing a cache, cross thrashing occurs. Cross thrashing occurs when too many processing components attempt to utilize an SoCs cache at the same time.

If a first processing component detects a cache miss, the cache is rewritten with the data that was retrieved from the main memory. When a second processing component checks the cache, another cache miss occurs, and the cache is again rewritten with the new data from the main memory. When the first processing component checks the cache, another cache miss will occur, because all of the data in the cache has been rewritten by the second processing component. In this manner, the cache is constantly being rewriting because each processing component is detecting a cache miss every time it checks the cache.

In operation, consider the situation where a user will instruct peripheral device 120 to begin playing audio data. Peripheral device 120 will then instruct main CPU 108 that audio data needs to be played, via secondary interconnect 104 and main system interconnect 102. After receiving instructions that audio data needs to be played from peripheral device 120, main CPU 108 instructs audio component 110 that it needs to begin processing audio data to be played, via bi-dircetional line 138. Audio component 110 informs main CPU 108 that it is ready to begin processing audio data, but that it can only process small portions of the audio data at a time.

At this point, main CPU 108 needs to locate the first small portion of audio data to be processed by audio component 110. Main CPU 108 first checks if the small portion of audio data to be processed is located in cache 116. Main CPU 108 finds that cache 116 does not contain the required audio data. Since cache 116 does not contain the required audio data, main CPU 108 then locates the audio data in main memory 118.

Main CPU 108 locates the first small portion of audio data to be processed as well as the test of the audio data to be played. Main CPU 108 then writes all of the audio data to be processed to cache 116. After writing the audio data to cache 116, main CPU 108 transmits the first small portion of audio data to be processed to audio component 110.

Audio component 110 then processes the audio data, and transmits the processed data to peripheral device 120, via main system interconnect 102 and secondary interconnect 104. After transmitting the processed data to peripheral device 120, audio component 110 instructs main CPU 108 that it is ready to process the next portion of audio data. Main CPU 108 checks if the next small portion of audio data is located in cache 116. Main CPU 108 finds that cache 116 does contain the next small portion of audio data.

Main CPU 108 transmits the data from cache 116 to audio component 110 to be processed. Again, audio component 110 processes the audio data, transmits the processed data to peripheral device 120, and then instructs main CPU 108 that is ready for the next small portion of audio data. Conventional multimedia SoC 100 will continue to operate in this manner until a later time.

At some time later, let the user instruct peripheral device 120 to begin playing video data in addition to the currently playing audio data. Peripheral device 120 will then instruct secondary CPU 112 that video data needs to be played, via secondary interconnect 104 and main system interconnect 102. After receiving instructions that video data needs to be played from peripheral device 120, secondary CPU 112 instructs video component 114 that it needs to begin processing video data to be played, via bi-directional line 140. Video component 114 informs secondary CPU 112 that it is ready to begin processing video data, but that it can only process small portions of the video data at a time.

At this point, secondary CPU 112 needs to locate the first small portion of video data to be processed by video component 114. Secondary CPU 112 first checks if the small portion of video data to be processed is located in cache 116. Secondary CPU 112 finds that cache 116 contains audio data and not the required video data. Since cache 116 does not contain the required video data, secondary CPU 112 then locates the video data in main memory 118.

Secondary CPU 112 locates the first small portion of video data to be processed as well as the rest of the video data to be played. Secondary CPU 112 then writes all of the video data to be processed to cache 116. After writing the video data to cache 116, secondary CPU 112 transmits the first small portion of video data to be processed to video component 114.

Simultaneously, audio component 110 instructs main CPU 108 that it has finished processing a small portion of audio data and is ready to process the next portion of audio data. Main CPU 108 checks if the next small portion of audio data is located in cache 116. Main CPU 108 finds that cache 116 contains video data but not the required audio data.

Since main CPU 108 cannot find the required audio data in cache 116 it must find the audio data in main memory 118. Locating and fetching the required audio data from main memory 118 instead of cache 116 takes a long time and conventional multimedia SoC 100 is no longer able to meet the latency requirements for playing audio data. In order to meet the latency requirements for playing audio data, main CPU 108 rewrites cache 116 with the required audio data.

Next, video component 114 processes the video data from secondary CPU 112 and transmits the processed data to peripheral device 120, via main system interconnect 102 and secondary interconnect 104. After transmitting the processed video data to peripheral device 120, video component 114 instructs secondary CPU 110 that it is ready to process the next small portion of video data.

After being instructed that video component 114 is ready to process the next small portion of video data, secondary CPU 112 checks if the next small portion of video data is located in cache 116. Since cache 116 was just rewritten with audio data by main CPU 108, secondary CPU 112 does not find the required video data in cache 116.

Since secondary CPU 112 cannot find the required video data in cache 116 it must find the video data in main memory 118. Locating and fetching the required video data from main memory 118 instead of cache 116 takes a long time and conventional multimedia SoC 100 is no longer able to meet the latency requirements for playing video data. In order to meet the latency requirements for playing video data, secondary CPU 112 then rewrites cache 116 with the required video data.

At this point, cross thrashing continues to occur in conventional multimedia SoC 100. Main CPU 108 and secondary CPU 112 continually overwrite each other's data in cache 116. Since cache 116 is continually over written, main CPU 108 and secondary CPU 112 are forced to continually fetch data from main memory 118. Since main CPU 108 and secondary CPU 112 are continuously fetching data from main memory 118, conventional multimedia SoC 100 is unable to meet latency requirements.

Additionally, the amount of data that can be fetched from main memory 118 at any one time is limited. Due to cross thrashing, both of main CPU 108 and secondary CPU 112 are forced to fetch data from main memory 118. Due to the limited bandwidth of main memory 118, one CPU may have to wait for the other to finish fetching data before it may begin fetching its own data, further increasing latency as well as decreasing throughput.

One method of handling cross thrashing is to use a partitioned cache. In a partitioned cache, each processing component of a conventional multimedia SoC has a designated section of a cache to use. Cache partitioning reduces cross thrashing because each processing component is only able to rewrite its own designated section of cache. Cache partitioning requires a large cache which is not feasible in conventional multimedia SoCs, because as cache size increases it becomes slower to fetch data in the cache.

Block coding is a technique used during video encoding to encode data in discrete chunks known as macroblocks (MB). An MB typically consists of an array of 4×4, 8×8, or 16×16 pixel samples that may be further subdivided into several different types of blocks to be used during the block decoding process. After each MB is encoded it is stored in memory next to the previously encoded MB.

A loop filter (LPF) is a filter that is applied to decoded compressed video to improve visual quality and prediction performance by smoothing the sharp edges which can form between MBs when block coding/decoding techniques are used. During block decoding, an LPF may access and decode each MB in order from the main memory and then use the MB to predict the next MB that will need to be fetched and decoded from the main memory.

Examples of processing components accessing data in the main memory of a conventional multimedia SoC will now be described with additional reference to FIGS. 2-3.

Figure 2:
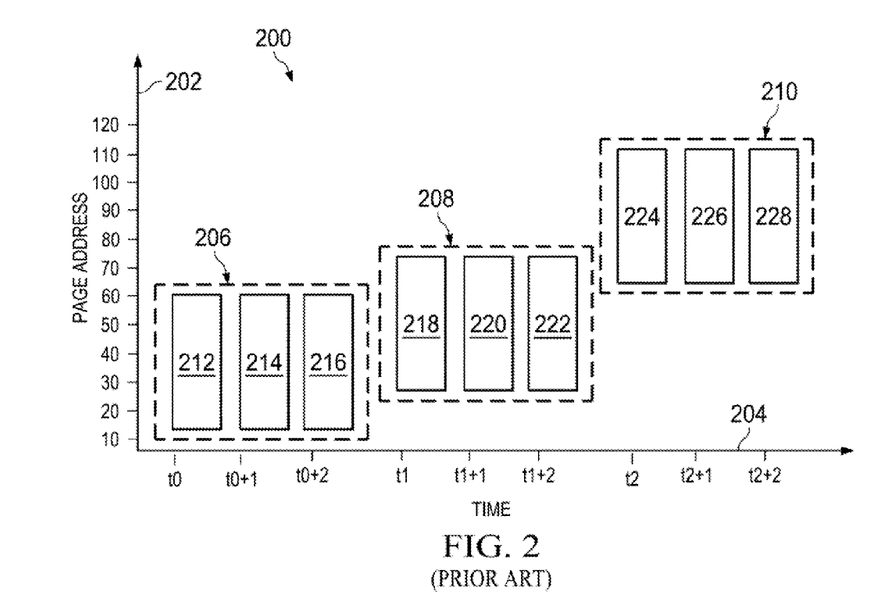
FIG. 2 illustrates a graph of memory address distribution of an LPF for 11264 video decoding at a granular level.

FIG. 2 illustrates a graph 200 of memory address distribution of an LPF for H264 video decoding at a granular level.

As illustrated in the figure, graph 200 includes a Y-axis 202, an X-axis 204, an MB block 206, an MB block 208, and an MB block 210. MB block 206 further includes MB 212, MB 214, and MB 216. MB block 208 further includes MB 218, MB 220, and MB 222. MB block 210 further includes MB 224, MB 226, and MB 228.

Y-axis 202 represents memory addresses. X-axis 204 represents time.

MB block 206 represents the all of individual MB blocks that are being accessed by an LPF from time $t_0$ to time $t_1$. MB block 208 represents the all of individual MB blocks that are being accessed by an LPF from time $t_1$ to time $t_2$. MB block 210 represents the all of individual MB blocks that are being accessed by an LPF beyond time $t_2$.

MB 212, MB 214, MB 216, MB 218, MB 220, MB 222, MB 224, MB 226, and MB 228 each represent the range of addresses at which data is stored in the main memory for an MB block being process by an LPF.

Data for each of MB 212, MB 214, MB 216, MB 218, MB 220, MB 222, MB 224, MB 226, and MB 228 are stored is stored in the main memory between address 0 and address 100. At time $t_0$, an LPF is instructed to decode MB block 206. The LPF then begins decoding the first MB, which is MB 212.

While decoding, data needed by the LPF is fetched between address 20 and address 60 for MB 212 between time $t_0$ and time $t_{0+1}$. Next the LPF uses MB 212 to predict that the next two MBs that need to be decoded are MB 214, and MB 216. The LPF then decodes MB block 214 between time $t_{0+1}$ and time $t_{0+2}$, during which time data needed to decode block MB 214 is accessed between address 20 and address 60. Finally, after decoding MB 214, the LPF decodes MD 216 in the same manner between time $t_{0+2}$ and time $t_1$, during which time data needed to decode block MB 214 is accessed between address 20 and address 60.

At time $t_1$, after finishing decoding each MB in MB block 206, the LPF is instructed to decode MB block 208 next. Again, the LPF begins by decoding the first MB of MB block 208, which is MB 218. The LPF decodes MB 218 between time $t_1$ and time $t_{1+i}$. While decoding, the LPF uses MB 218 to predict that the next two MBs that need to be decoded are MB 220, and MB 222. Next, the LPF decodes MB 220 between time $t_{1+i}$ and time $t_{1+2}$, and MB 222 between time $t_{1+2}$, and time $t_2$.

After MB 218, MB 220, and MB 222 are decoded, the LPF is instructed to decode the next MB which is MB 224. As described above, the LPF uses MB 224 to predict which MBs need to be decoded next and then fetches all of the MBs at their address in the main memory. Once fetched, the LPF decodes the MBs and waits for further instructions.

Accessing each MB from the main memory is very bandwidth intensive. The bandwidth is increased when the LPF access multiple MBs from different locations in the main memory due to MB decoding predictions. Writing the entire MB block that contains the current MB to be decoded to a cache would reduce the main memory bandwidth being used. Using a cache, the LPF would only need to fetch a MB block once from the main memory, and then could fetch each individual MB from the cache.

Block motion compensation is an algorithmic technique used to predict a frame in a video given the previous and/or future frames by accounting for the motion of the camera and or the objects in the video. Block motion compensation exploits the fact that for many frames of a video, the only difference between two consecutive frames is camera movement or an object in the frame moving. Using motion compensation, a video stream will contain some full frames to be used as a reference, the only information needed to be stored between reference frames would be information needed to transform the previous frame into the next frame. Similar to block encoding/decoding, block motion compensation uses MBs that are 4×4, 8×8, or 16×16 pixels in size.

Figure 3:
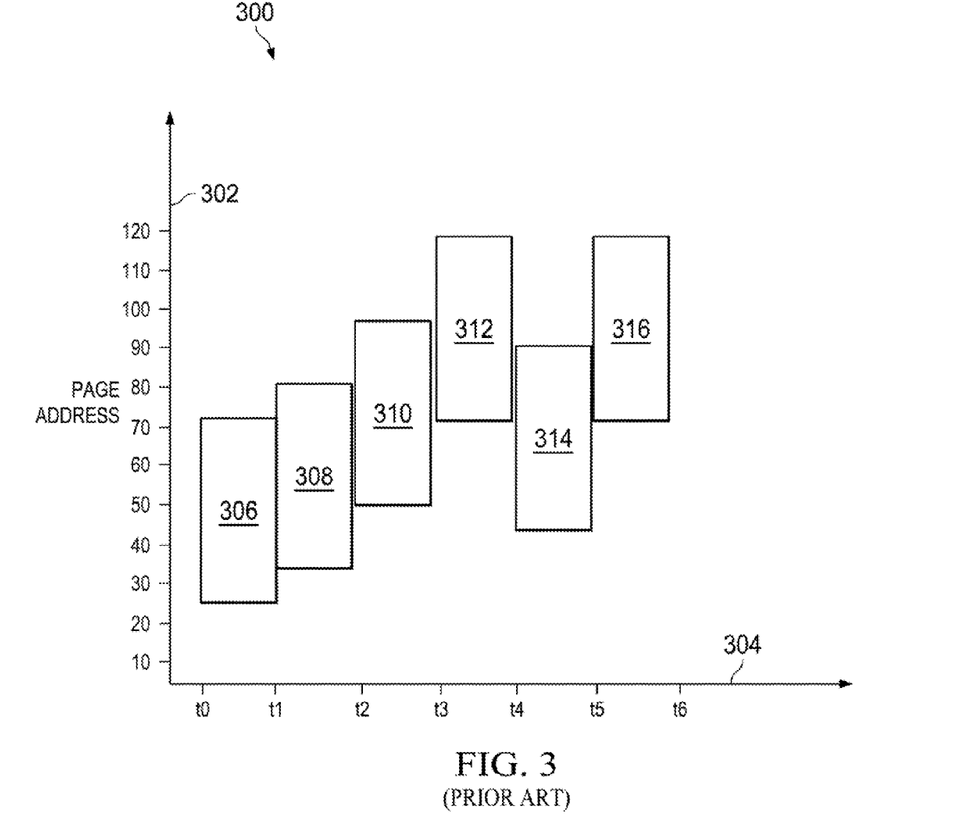
FIG. 3 illustrates a graph of memory address distribution for a motion compensator of an H264 decoder.

FIG. 3 illustrates a graph 300 of memory address distribution for a motion compensator of an H264 decoder.

As illustrated in the figure, graph 300 includes a Y-axis 302, an X-axis 304, an MB 306, an MB 308, an MB 310, an MB 312, an MB 314, and an MB 316.

Y-axis 302 represents memory addresses. X-axis 304 represents time.

MB 306 MB 308, MB 310, MB 312, MB 314, and MB 316 each represent the range of address at which data is stored in memory for that particular MB.

In operation, at time $t_0$, a motion compensator is instructed to compensate for movement between two frames. At this point, the motion compensator begins compensating for motion by processing MB 306. While processing MB 306, the motion compensator fetches data stored in memory between address 20 and address 70, between time $t_0$ and time $t_1$. After processing MB 306, the motion compensator needs to process MB 308 to continue compensating for motion between two frames. The motion compensator process MB 308 from time $t_1$ and time $t_2$, during which time data is fetched between memory address 30 and memory address 80.

The motion compensator continues process each of MB 310, MB 312, MB 314, and MB 316. As described above, the motion compensator processes each MB by fetching and process data stored at the addresses within the boundaries of each MB.

Similar to the LPF of FIG. 2, a motion compensator accessing all of the MBs needed for motion compensation from the main memory is very bandwidth intensive. Writing each MB to a cache would reduce the main memory bandwidth used. Since individual MBs are used several times to transform one reference MB into another, a cache with a LRU policy could be used. Using a LRU policy would lower cache misses by only evicting the MB that has gone the longest duration since being used.

Both the LPF of FIG. 2 and the motion compensator of FIG. 3 fetch different types of data from different sections of the main memory. The locality of data for different processing components will now be described in FIG. 4.

Figure 4:
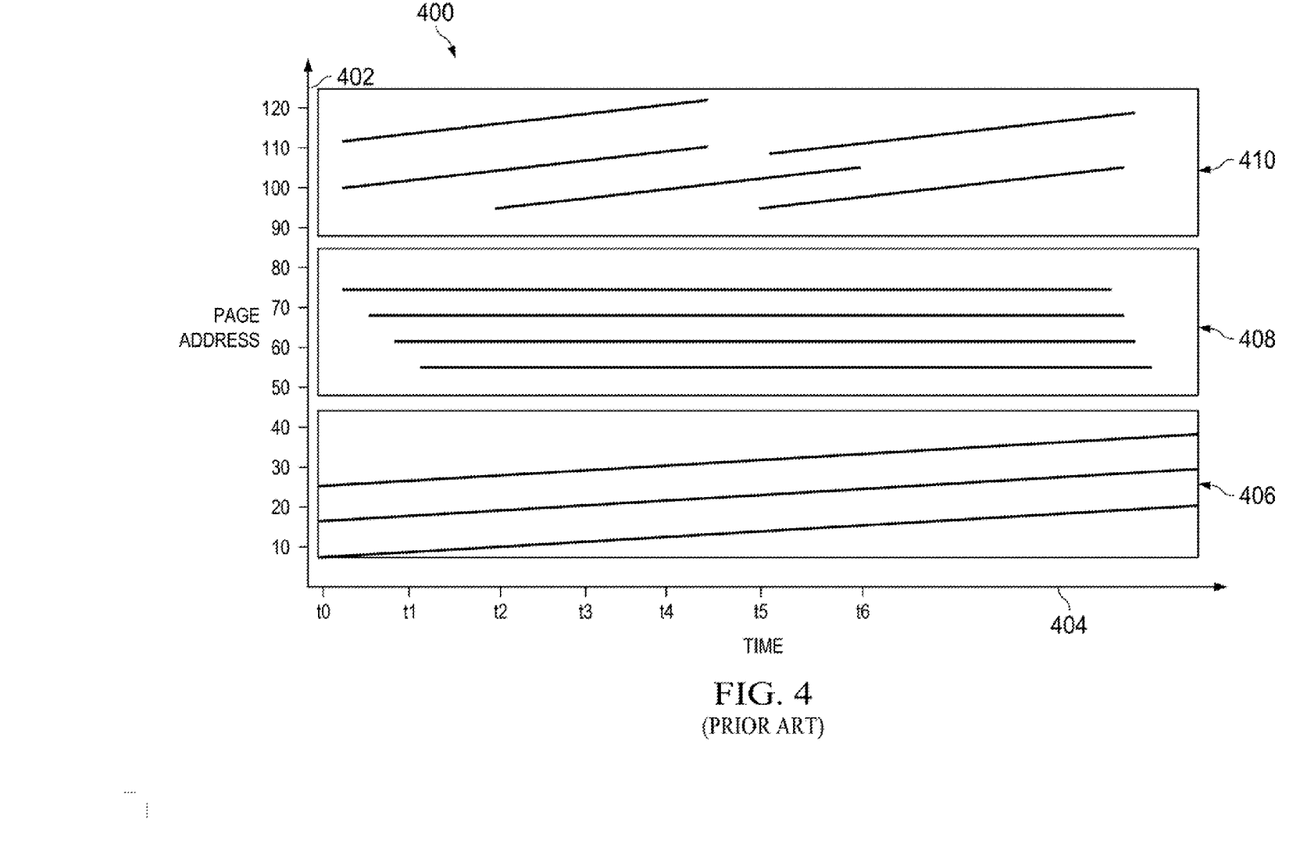
FIG. 4 illustrates a graph of a main memory address distribution for multiple processing components.

FIG. 4 illustrates a graph 400 of a main memory address distribution for multiple processing components.

As illustrated in the figure, graph 400 includes a Y-axis 402, an X-axis 404, a memory address portion 406, a memory address portion 408, and a memory address portion 410.

Y-axis 402 represents memory addresses. X-axis 404 represents time.

Memory address portion 406 represents all of the addresses of data for use by an LPF. Memory address portion 408 represents all of the addresses of data for use by a motion compensator. Memory address portion 410 represents all of the address of data for use by an imaging component.

In operation, all data for use by an LPF is located at an address within memory address portion 406. When an LPF needs to fetch data from the main memory, it always fetches data from an address within memory address portion 406. An LPF will not fetch data from memory address portion 408 or memory address portion 410.

Similarly, all data for use by a motion compensator is located at an address within memory address portion 408 and all data for use by an imaging component is located at an address within memory address portion 410. A motion compensator will not fetch data from memory address portion 406 or memory address portion 410, and an imaging component will not fetch data from memory address portion 406 or memory address portion 408.

FIG. 4 may also be used to further illustrate cross thrashing of processing components in a conventional multimedia SoC. Since data is fetched from one of address portion 406, address portion 408, or address portion 410 by multiple processing components, cached data would continually be evicted to make room for the newly fetched data. Multiple processing components fetching data from memory would continually overwrite the cache, creating cross thrashing.

A problem with the conventional system and method for fetching data on a multimedia SoC is that cross thrashing occurs when multiple processing components are using a single cache. Each time a cache miss occurs, the processing component that created the cache miss overwrites the cache with data fetched from the main memory. When another processing component attempts to access data in the cache, a cache miss occurs because it was just over written.

Multiple processing components using a single cache not only creates cross thrashing but also requires each component to fetch data from the main memory. Processing components continually fetching data from the main memory of a conventional multimedia SoC increases latency and decreases throughput.

Another problem with the conventional system and method for fetching data on a multimedia SoC is that partitioned caches are impractical. Conventional partitioned caches are very large, which is not beneficial to conventional multimedia SoCs since cache speed decreases as the cache size increases. The size of conventional partitioned caches reduce cross thrashing, but due to their size and speed there is no benefit when compared to fetching data from the main memory.

Another problem with the conventional system and method for fetching data from the main memory of a multimedia SoC is the limited bandwidth of the main memory. As more components fetch data from the main memory, more bandwidth is taken up. Limited main memory bandwidth limits the amount of data that can be fetched from the main memory at one time which increases latency and decreases throughput.

What is needed is a system and method for using a cache with a multimedia SoC that eliminates cross thrashing without increasing latency or decreasing throughput.

BRIEF SUMMARY

The present invention provides a system and method for using a cache with a multimedia SoC that eliminates cross thrashing without increasing latency or decreasing throughput.

Aspects of the present invention are drawn to a system that includes first and second processing components, a qualified based splitter component, a first and second configurable cache element and an arbiter component. The first data processing component generates a first request for a first portion of data at a first location within a memory. The second data processing component generates a second request for a second portion of data at a second location within the memory. The qualifier based splitter component routes the first request and the second request based on a qualifier. The first configurable cache element enables or disables prefetching data within a first region of the memory. The second configurable cache element enables or disables prefetching data within a second region of the memory. The arbiter component routes the first request and the second request to the memory.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate example embodiments of the present invention and, together with the description, serve to explain the principles of the invention. In the drawings.

DETAILED DESCRIPTION

The present invention provides a system and method for using a qualified based splitter, a configurable cache, and an arbiter to reduce cross thrashing, latency, and increase throughput for multiple processing components of a multimedia SoC.

In accordance with a first aspect of the present, a qualified based splitter is used to route transactions from a processing component based on qualifiers such as memory address, type of transaction, and master identifier. The qualified based splitter can be configured dynamically in order to route processing component transactions to a designated cache. The qualified based splitter is also able to route transactions that are not cache friendly directly to an arbiter.

Using a qualifier based splitter allows transactions to be routed to the cache best suited to handle a given type of transaction. Since a cache may be configured and optimized to suit the needs of a particular processing component or transaction type, the ability to route transactions to a cache that has been configured to suit the needs of a particular processing component or transaction type decreases cross thrashing and latency and increases the throughput of a given processing component as well as the overall performance of a multimedia SoC.

In accordance with a second aspect of the present invention, a configurable cache that is able to be dynamically reconfigured to accommodate a certain type of transaction from a processing component. The configurable cache is able to be configured with a pre-fetching enabled or disabled, and cache write through or cache write back mode. Using a cache that can be dynamically reconfigured allows the cache hit/miss ratio, speed, and transaction type designation of a cache to be optimized to decrease the number of times data must be fetched from the main memory of a multimedia SoC. Utilizing configurable caches decreases latency associated with a processing component fetching data from the main memory which simultaneously increases the available bandwidth of the main memory.

Pre-fetching is a technique used to speed up SoCs by reducing wait time. Since the hardware on SoCs is much faster than the memory where data is stored, data cannot be fetched fast enough to keep the hardware busy. Pre-fetching is when data is requested before it is actually needed. Once the data is fetched from the memory, it is stored in the cache. When the data is then needed, it can quickly be read from the cache, preventing the hardware from stalling. A pre-fetch enable cache is able to pre-fetch data, while a pre-fetch disabled cache is not able to pre-fetch data.

Write through caching is a method of writing data to a cache. In a write through cache, data is written to the cache and the memory simultaneously. A write through cache is safe, but experiences latencies due to writing to the memory.

Write back caching is another method of writing data to a cache. In a write back cache, data is only written to the cache at system start up. Data is only written from the cache to the memory until a data in the cache is to be modified or evicted. Write back caching is not as safe as write through, but write back caching decreases latency because of the reduced number of times data needs to be written to the memory.

Data shared between two or more processing elements requires write through caching to be used to maintain data coherency. If a write back cache is used by one processing element and a write through cache is used by another element, the processing element using the write through cache may write data to the memory several times before the write back cache has to write data to the memory. In this case, the processing component using data stored in the write back cache may not be using the newest data that was written by the write through cache, leading to data decoherence.

Each configurable cache is also able to be configured with a replacement policy for evicting data. Any known type of replacement policy may be implemented in accordance with aspects of the present invention, non-limiting examples of which include a least recently fetched (LRF) policy, least recently used (LRU) policy, or pseudo least recently used (PLRU).

In a LRU replacement policy, data is evicted based on the amount of time that has passed since the last time it was used. Data that has been in the cache the longest without being accessed by a processing component is evicted. LRU replacement policies are quite costly, because it requires tracking the access time of each line of data in the cache, which then needs to be sorted and elected for eviction.

A PLRU replacement policy is similar to an LRU policy except data is elected for eviction differently. In a PLRU policy the access time of each piece of data is still tracked, but instead of evicting the piece of data that has gone the longest time without being accessed, one of several pieces of data that has gone the longest is evicted. For example, a PLRU may evicted any piece of data that has not been accessed within a predetermined time, or may evicted any piece out of the 10 pieces of data that have gone the longest without being accessed.

In accordance with aspects of the present invention, a configurable cache may implement an LRF replacement policy such that; data is evicted based on the amount of time that has passed since the time the data was first fetched. A LRF policy is beneficial when data is fetched from addresses incrementally. When data is fetched from addresses incrementally, for example; a first piece of data is fetched and used by a processing component, once finished a second piece of data is fetched. Once the second piece of data has been fetched, the first piece of data is not used or need to be fetched again. In this way, an LRF policy can easily be implemented using a circular buffer.

In multimedia, data is generally fetched incrementally. For example, video data is stored in sequence in memory. Since video data is processed line by line, once the data for a frame has been processed it can be evicted from the cache to make room for the data of the next frame which makes a LRF policy suitable for multimedia processing components of an SoC.

Due to the cost and power required by LRU and PLRU replacement policies, they are best suited to be used with CPU and processor workloads.

Using a qualified based splitter and configurable caches improves the latency and throughput of a multimedia SoC while also reducing cross thrashing and memory bandwidth that is used.

Example systems in accordance with aspects of the present invention will now be described with reference to FIGS. 5-7.

Figure 5:
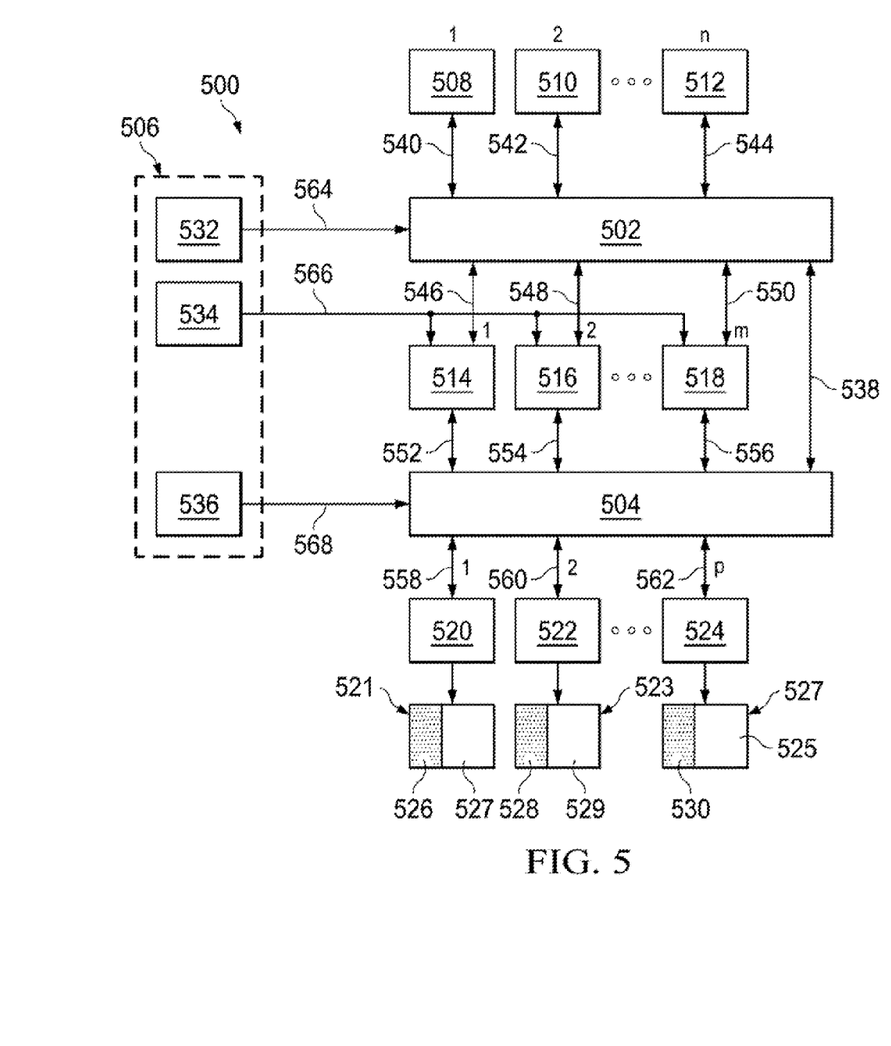
FIG. 5 illustrates a multimedia SoC in accordance with aspects of the present invention.

FIG. 5 illustrates multimedia SoC 500 in accordance with a first aspect and second aspect of the present invention.

As illustrated in the figure, multimedia SoC 500 includes a qualifier based splitter 502, an arbiter 504, a controlling component 506, a plurality of processing components—a sampling of which are indicated as a processing component 508, a processing component 510 and a processing component 512, a plurality of configurable caches—a sampling of which are indicated as a configurable cache 514, a configurable cache 516 and a configurable cache 518, a plurality of memories—a sampling of which are indicates as a memory 520, a memory 522 and a memory 524, a data 521, a data 523, a data 525 and a bypass path 538. Controlling component 506 further includes a controller 532, a controller 534, and a controller 536.

Qualifier based splitter 502 is operable to receive transaction requests from processing component 508, via a bi-directional line 540, to receive data from one of the configurable caches. Similarly, qualifier based splitter 502 is operable to receive transaction requests from processing component 510, via a bi-directional line 542, to receive data from one of the configurable caches. Further, qualified based splitter 502 is operable to receive transaction requests from any of the processing components, via a corresponding bi-directional line, e.g., processing element 512, via a bi-directional line 544. Finally, qualified based splitter 502 is operable to transmit data to any of the processing components via a corresponding bi-directional line.

Qualifier based splitter 502 is additionally operable to route transaction requests from any of the processing components to configurable cache 514, via a bi-directional line 546, based on a qualifier. Similarly, qualifier based splitter 502 is additionally operable to route transaction requests from any of the processing components to configurable cache 514, via a bi-directional line 546, based on the qualifier. Finally, qualified based splitter 502 is additionally operable to route transaction requests from any of the processing components to any of the remaining configurable caches, via a corresponding bi-directional line, e.g., configurable cache 514, via a bi-directional line 546, based on the qualifier. The qualifier may be based on address range, type of transaction, master identifier, or combinations thereof.

Qualified based splitter 502 is yet further operable to be dynamically configured by controller 532 of controlling component 506, via a line 564.

Arbiter 504 is operable to receive forwarded transaction requests from configurable cache element 514, via a bi-directional line 552, forwarded transaction requests from configurable cache element 516, via a bi-directional line 554, operable to receive forwarded transaction requests from configurable cache element 518, via a bi-directional line 556, and operable to receive transaction requests from qualifier based splitter 502, via a bypass path 538.

Arbiter 504 is additionally operable to route a forwarded transaction request or transaction request based on a load sharing policy to any of memory 520, via a bi-directional line 558, to memory 522, via a bi-directional line 560, or to memory 524, via a bi-directional line 562. Arbiter 504 is yet further operable to be dynamically configured by controller 536 of controlling component 506, via a line 568.

Processing component 508 is operable to transmit a transaction request to qualifier based splitter 502, via bi-directional line 540, for data 521 of memory 520, data 523 of memory 522, or data 525 of memory 524. Processing component 510 is operable to transmit a transaction request to qualifier based splitter 502, via bi-directional line 542, for data 521 of memory 520, data 523 of memory 522, or data 525 of memory 524. Processing component 512 is operable to transmit a transaction request to qualifier based splitter 502, via bi-directional line 544, for data 521 of memory 520, data 523 of memory 522, or data 525 of memory 524.

Each of processing component 508, processing component 510, and processing component 512 are operable to receive one of data 521 of memory 520, data 523 of memory 522, or data 525 of memory 524 qualifier based splitter 502 based on a previously transmitted transaction request.

Configurable cache 514 is operable to transmit a transaction back to qualifier based splitter 502, via bi-directional line 546, if there is a cache hit, or forward the transaction request to arbiter 504, via bi-directional line 552, if there is a cache miss.

In this example embodiment, configurable cache 514 is further operable to contain a write back and pre-fetch disabled cache element, and a configurable cache replacement policy. Configurable cache 514 yet further operable to enable or disable prefetching of data from one of memory 520, memory 522, or memory 524 based on the state of its pre-fetch element.

Configurable cache 516 is operable to transmit a transaction back to qualifier based splitter 502, via bi-directional line 548, if there is a cache hit, or forward the transaction request to arbiter 504, via bi-directional line 554, if there is a cache miss.

Configurable cache 516 is further operable to contain a write through and pre-fetch disabled cache element. Configurable cache 516 yet further operable to enable or disable prefetching of data from one of memory 520, memory 522, or memory 524 based on the state of its pre-fetch element.

Configurable cache 518 is operable to receive a transaction request from qualifier based splitter 502, via bi-directional line 550. Configurable cache 518 is additionally operable to transmit a transaction back to qualifier based splitter 502 if there is a cache hit, or forward the transaction request to arbiter 504, via bi-directional line 556, if there is a cache miss.

Configurable cache 518 is further operable to contain a pre-fetch enabled cache element. Configurable cache 518 yet further operable to enable or disable prefetching of data in one of memory 520, memory 522, or memory 524.

Each of configurable cache 514, configurable cache 516, and configurable cache 518 are operable to be dynamically configured by controller 534 of controlling component 506, via a line 566. In this example embodiment, each of configurable cache 514, configurable cache 516, and configurable cache 518 are additionally operable to have a LRF replacement policy.

Memory 520 is operable to receive a transaction request from or transmit data 521 to arbiter 504, via bi-directional line 558. Memory 522 is operable to receive a transaction request from or transmit data 523 to arbiter 504, via bi-directional line 560. Memory 524 is operable to receive a transaction request from or transmit data 525 to arbiter 504, via bi-directional line 562.

Memory 520 is additionally operable to store data 521. Memory 522 is additionally operable to store data 523. Memory 524 is additionally operable to store data 525.

Data 521 is located starting at address 527 of memory 520. Data 523 is located starting at address 529 of memory 522. Data 525 is located starting at address 531 of memory 524.

Controller 532 is operable to dynamically configure qualifier based splitter 502, via line 564. Controller 534 is operable to dynamically configure each of configurable cache 514, configurable cache 516, or configurable cache 518, via line 566. Controller 536 is operable to dynamically configure arbiter 504, via line 568.

Bypass path 538 is operable to allow qualifier based splitter 502 to bypass configurable cache 514, configurable cache 516, and configurable cache 518 and transmit transaction requests directly to arbiter 504. Bypass path 538 is additionally operable to allow arbiter 504 to bypass configurable cache 514, configurable cache 516, and configurable cache 518 and transmit transactions directly to qualifier based splitter 502.

This example embodiment includes three separate instances of a processing component, configurable cache, and memory. The required numbers of instances are not required to be identical in practice. In some embodiments, there may only be a single processing component, 5 configurable caches, and a single memory. In other embodiments, there may be 10 processing components, 15 configurable caches, and 4 memories.

In this example, qualifier based splitter 502, arbiter 504, processing component 508, processing component 510, processing component 512, configurable cache 514, configurable cache 516, configurable cache 518, memory 520, memory 522, memory 524, controller 532, controller 534, and controller 536 are illustrated as individual devices. However, in some embodiments, at least two of qualifier based splitter 502, arbiter 504, processing component 508, processing component 510, processing component 512, configurable cache 514, configurable cache 516, configurable cache 518, memory 520, memory 522, memory 524, controller 532, controller 534, and controller 536 may be combined as a unitary device. Further, in some embodiments, at least one of qualifier based splitter 502, arbiter 504, processing component 508, processing component 510, processing component 512, configurable cache 514, configurable cache 516, configurable cache 518, memory 520, memory 522, memory 524, controller 532, controller 534, and controller 536 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

In operation, consider the situation where processing component 508 transmits a transaction request to qualifier based splitter 502, via bi-directional line 540, for data 521. After receiving the transaction request, qualifier based splitter 502 will determine where to route the request. In this non-limiting example embodiment, qualifier based splitter 502 determines where to route transaction requests based on the master identifier of the transaction request. In other example embodiments qualifier based splitter 502 may determine where to route transaction requests based on address range, type of transaction, master identifier, or combinations thereof.

Qualifier based splitter 502 finds that the master identifier of the transaction request corresponds to processing component 508. Qualifier based splitter 502 then routes the transaction request to the cache that corresponds to processing component 508, which in this example embodiment is configurable cache 514. Once the transaction request is received, via bi-directional line 546, configurable cache 514 checks to see if it contains data 521. Configurable cache 514 finds that it does not contain data 521 and then forwards the transaction request to arbiter 504, via bi-directional line 558.

Once arbiter 504 receives the transaction request, it examines the address of the data in the transaction request to determine where it should be routed. After examination, arbiter 504 determines that the transaction request should be routed to memory 520, via bi-directional line 558.

Once memory 520 receives the transaction request, it fetches data 521 at address 527. Once fetched, data 521 is transmitted back to arbiter 504. Arbiter 504 then transmits data 521 to configurable cache 514, which then writes data 521. At this point, data 521 is transmitted back to processing component 508, via qualifier based splitter 502. Next, processing component 508 processes data 521.

After data 521 is processed, it needs to be written to memory 520. Processing component 508 then transmits processed data 521 and a transaction request to qualifier based splitter 502. Again, qualifier based splitter 502 examines the transaction request and determines that the transaction request and processed data 521 should be transmitted to configurable cache 514.

Configurable cache 514 checks if there is enough space available to write processed data 521 without evicting data. Configurable cache 514 finds that there is space available and writes processed data 521. Since configurable cache 514, is a write back cache, the new data written to the cache is not transmitted to memory 520 to be written until data is evicted. At this point, all transaction requests for data 521 from processing component 508 can be filled by configurable cache 514.

At some time later, processing component 508 transmits a transaction request to qualifier based splitter 502 for data 523. As described above, qualifier based splitter 502 determines to route the transaction request to configurable cache 514. Configurable cache 514 finds that it does not contain data 523, and forwards the transaction request to arbiter 504.

Once arbiter 504 receives the transaction request, it examines the address of the data in the transaction request to determine where it should be routed. After examination, arbiter 504 determines that the transaction request should be routed to memory 522, via bi-directional line 560.

After receiving the transaction request, memory 520 fetches data 523 at address 529. After being fetched from memory 522, data 523 is transmitted back to configurable cache 514. Configurable cache 514 determines that it has enough room to write processed data 521 as well as data 523. Configurable cache 514 then writes data 523 where it is then forwarded to processing component 508.

Processing component 508 then processes data 523. After being processed, processed data 523 needs to be written to memory 522. Processing component 508 then transmits processed data 523 and a transaction request to qualifier based splitter 502. Again, qualifier based splitter 502 examines the transaction request and determines that the transaction request and processed data 523 should be transmitted to configurable cache 514.

Configurable cache 514 checks if there is enough space available to write processed data 523 without evicting data. Configurable cache 514 finds that it is not able to write processed data 528 without first evicting processed data 526. Configurable cache 514 then transmits a transaction request and processed data 526 to arbiter 504. Arbiter 504 routes the transaction request and processed data 526 to memory 520.

Once received, memory 520 overwrites data 521 with processed data 521 at address 527.

Simultaneously, after transmitting the transaction request and processed data 526 to arbiter 504, configurable cache 514 evicts processed data 526. After evicting processed data 526, configurable cache 514 then writes processed data 528.

At this time, all transaction requests for data 523 from processing component 508 can be filled by configurable cache 514. Since configurable cache 514 is a write back cache, there are very few calls to write stored data back to its address in memory. The low number of memory calls reduces latency which allows processing component 508 to meet all latency and throughput requirements.

At a later time, processing component 510 will transmit a transaction request to qualifier based splitter 502, via bi-directional line 542, for data 523. Qualifier based splitter 502 finds that the master identifier of the transaction request corresponds to processing component 510. Qualifier based splitter 502 then routes the transaction request to the cache that corresponds to processing component 510, which in this example embodiment is configurable cache 516.

Once the transaction request is received, via bi-directional line 548, configurable cache 516 checks to see if it contains data 523. Configurable cache 516 finds that it does not contain data 523 and then forwards the transaction request to arbiter 504, via bi-directional line 560.

After receiving the transaction request, arbiter 504 examines the address of the data in the transaction request to determine where it should be routed. After examination, arbiter 504 determines that the transaction request should be routed to memory 522, via bi-directional line 560.

Memory 522 receives the transaction request, and fetches data 523 at address 529. Once fetched, data 523 is transmitted back to arbiter 504. Arbiter 504 then transmits data 523 to configurable cache 516, which then writes data 523. After being written, configurable cache 516 transmits data 523 to processing component 510, via qualifier based splitter 502. Processing component 510 then processes data 523.

After data 523 is processed, it needs to be written to memory 522. Processing component 510 then transmits processed data 523 and a transaction request to qualifier based splitter 502. Again, qualifier based splitter 502 examines the transaction request and determines that the transaction request and processed data 523 should be transmitted to configurable cache 516.

Configurable cache 516 checks if there is enough space available to write processed data 523 without evicting data. Configurable cache 516 finds that there is space available and writes processed data 523. Since configurable cache 516, is a write through cache, new data written to the cache is always transmitted to memory to be written. Configurable cache 516 transmits processed data 523 to arbiter 504. Arbiter 504 then transmits processed data 523 to memory 522 where data 523 is overwritten with processed data 523 at address 529.

At this point, all transaction requests for data 523 from processing component 510 can be filled by configurable cache 516. Since configurable cache 516 is a write through cache, new data written to the cache is always written to its location in memory as well. Writing data to memory is slow, if processing component 510 transmits another transaction request that requires data to be fetched from memory, configurable cache 516 will not be able to process the request.

Data cannot simultaneously be written and fetched from memory due to the limited bandwidth of the memory. The memory must first write the new data before fetching the data of the next transaction request. Due to the large number of calls to memory of a write through cache, latency is significantly increased and processing component 510 is not able to meet its throughput requirements.

Configurable cache 514 and configurable cache 516 are initially pre-fetch disabled, so data cannot be retrieved from memory ahead of time. Since processing component 510 is not able to meet throughput requirements due to the write through process of configurable cache 516, controller 534 enables pre-fetching of data for configurable cache 516, via line 566.

With pre-fetching enabled, configurable cache 516 may fetch large data portions for processing component 510 ahead of time. Data written to configurable cache 516 from processing component 510 will still have to be written to memory, but new transaction requests will be able to be processed using pre-fetched data decreasing latency associated with waiting to fetch data from memory.

In another non-limiting example embodiment, instead of enabling pre-fetching data of configurable cache 516, controller 532 could have configured qualifier based splitter 502, via line 564, to route transaction requests from processing component 510 to configurable cache 518 which has data pre-fetching already enabled. In this example embodiment, after receiving a transaction request form qualifier based splitter 502, via bi-directional line 550, configurable cache 518 would check if it contained the data associated with the transaction request.

If configurable cache 518 found that it did not contain the data, it would forward the transaction request to arbiter 504, via bi-directional line 562. As described above, arbiter 504 would then route the transaction request to memory 522. The fetched data would then be transmitted back and written to configurable cache 518. At this point, configurable cache 518 would transmit the data back to processing component 510 and configurable cache 518 would be able to fill transaction requests from processing component 510.

In yet another non-limiting example embodiment, processing component 512 will transmit a transaction request for data 525 to qualifier based splitter 502, via bi-directional line 544. As described above, qualifier based splitter 502 determines from the master identifier of the transaction request that the data requested is not cache friendly.

After determining that the transaction request is not suitable to be used with a cache, qualifier based splitter 502 routes the transaction request directly to arbiter 504, via bypass path 538. Next, arbiter 504 routes the transaction request to memory 524, via bi-directional line 562, based on the address of the data in the transaction request.

Memory 524 receives the transaction request, and fetches data 525 at address 531. Once fetched, data 525 is transmitted back to arbiter 504. Arbiter 504 then transmits data 525 to qualifier based splitter 502, via bypass path 538. Qualifier based splitter 502 then transmits data 525 to processing component 512. Since bypass 538 was used for the transaction request, data 530 is not stored in a cache and must be fetched from memory 524 each time it is needed.

In the above embodiments, each of configurable cache 514, configurable cache 516, and configurable cache 518 are operable to fetch and write data from any one of memory 520, memory 522, or memory 524. In other non-limiting example embodiments, multimedia SoC may only have a single memory. In this case, configurable cache 514, configurable cache 516, and configurable cache 518 would fetch and write data to the same memory.

In this example embodiment, the single memory may be partitioned, as to allow configurable cache 514, configurable cache 516, and configurable cache 518 to fetch and write data to their designated section of the single memory to use.

In another non-limiting example embodiment, controller 536 may configure arbiter 504, via line 568, to route transaction requests to a single memory based on the transaction requests address range, type of transaction, master identifier, or combinations thereof.

Simulation results of a multimedia SoC in accordance with aspects of the present invention will now be discussed with reference to FIGS. 6-8.

Figure 6:
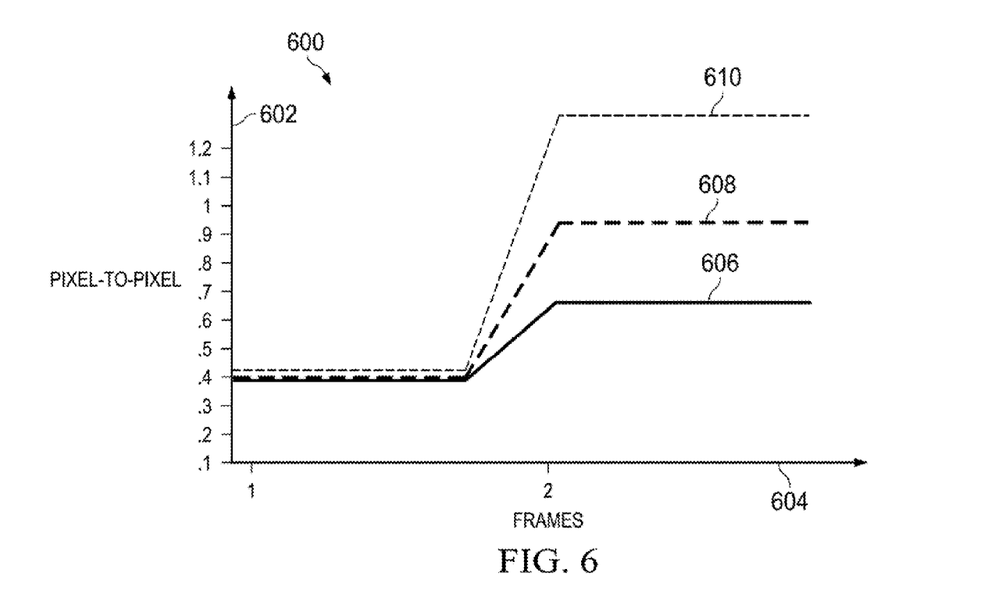
FIG. 6 illustrates a graph of the pixel-to-pixel ratio before and after cache as a measure of bandwidth reduction for motion compensation of a multimedia SoC in accordance with aspects of the present invention.

FIG. 6 illustrates a graph 600 of the pixel-to-pixel ratio before and after cache as a measure of bandwidth reduction for motion compensation of a multimedia SoC in accordance with aspects of the present invention.

As illustrated in the figure, graph 600 includes a Y-axis 602, an X-axis 604, a line 606, a line 608, and a line 610.

Y-axis 602 represents pixel-to-pixel ratio. X-axis 604 represents frames. The pixel-to-pixel ratio is a measure of how many bytes are needed per pixel per frame.

Line 606 represents a multimedia SoC with a 64 KB cache in accordance with aspects of the present invention. Line 608 represents a multimedia SoC with a 16 KB cache in accordance with aspects of the present invention. Line 606 represents a multimedia SoC with a 8 KB cache in accordance with aspects of the present invention.

In operation, there is no gain associated with different cache sizes from frame 1 to frame 2 because the initial frame is still being processed. At frame 2 however, a new frame is processed and there is a need for compensation for the motion between the two frames. As illustrated in graph 600 the number of bytes needed to compensate between two frames for a 64 KB is much lower than that of a 16 KB cache, and nearly half of that of an 8 KB cache.

Figure 7:
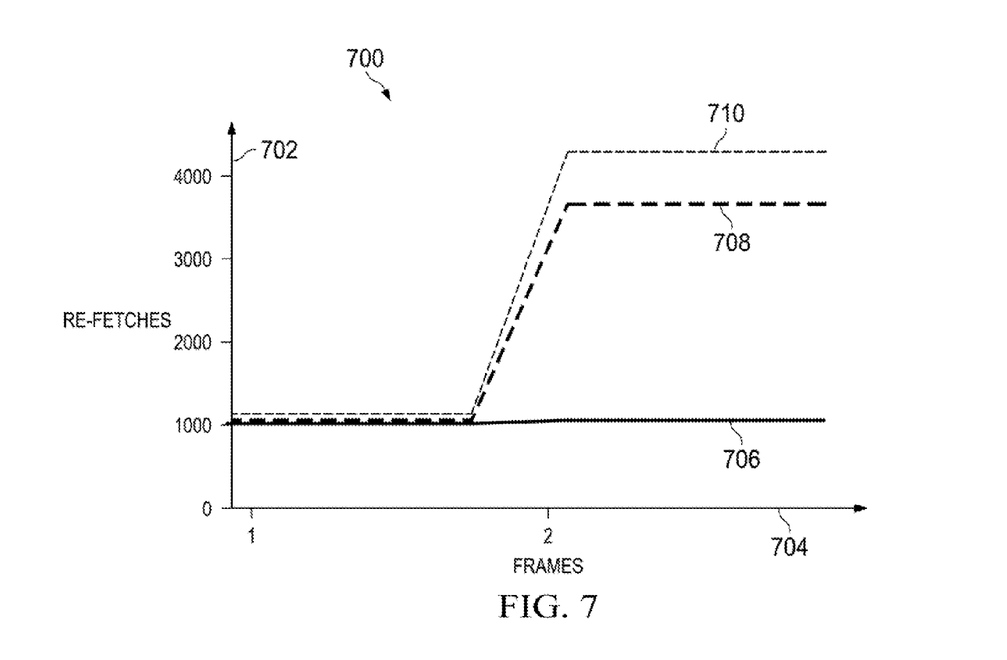
FIG. 7 illustrates a graph of the number of re-fetches per frame for motion compensation of a multimedia SoC in accordance with aspects of the present invention.

FIG. 7 illustrates a graph 700 of the number of re-fetches per frame for motion compensation of a multimedia SoC in accordance with aspects of the present invention.

As illustrated in the figure, graph 700 includes a Y-axis 702, an X-axis 704, a line 706, a line 708, and a line 710.

Y-axis 702 represents re-fetches. X-axis 704 represents frames.

Line 706 represents a multimedia SoC in accordance with aspects of the present invention. Line 708 represents a conventional multimedia SoC. Line 710 represents a conventional multimedia SoC without a cache.

In operation, the number of re-fetches for a single frame is minimal for multimedia SoC in accordance with aspects of the present invention, a conventional multimedia SoC, and a conventional multimedia SoC without cache. At frame 2 a new frame is processed. The number of re-fetches due data not being in cache for a conventional multimedia SoC and a conventional multimedia SoC without cache spikes significantly as shown by line 708 and line 710. The number of re-fetches for data from the main memory increases latency and decrease throughput.

A multimedia SoC in accordance with aspects of the present invention does not see an increase in re-fetches as shown by line 706. Since a multimedia SoC in accordance with aspects of the present invention has a better management and cache utilization, data stays stored in cache and does not need to be re-fetched from memory.

Figure 8:
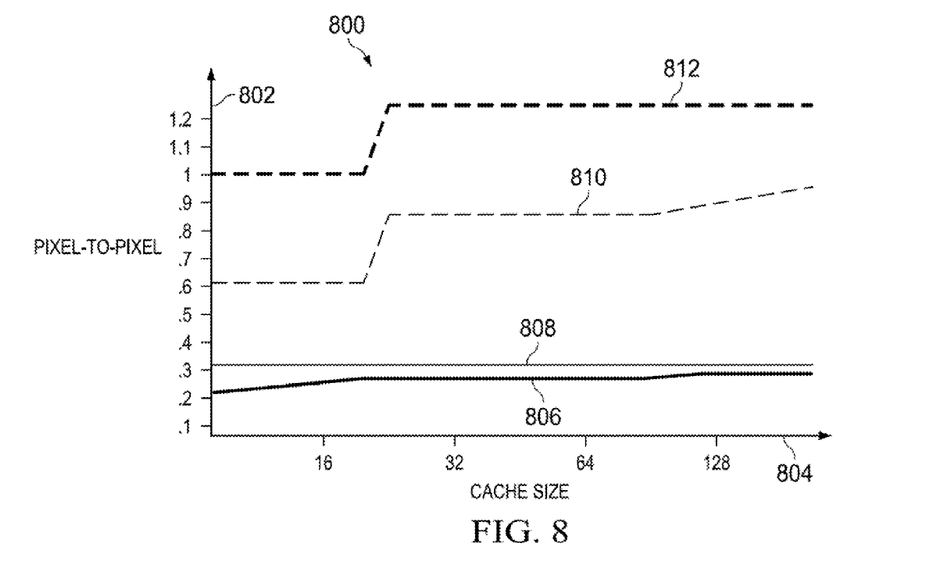
FIG. 8 illustrates a graph of memory bandwidth utilization for various sized caches for motion compensation in a multimedia SoC in accordance with aspects of the present invention.

FIG. 8 illustrates a graph 800 of memory bandwidth utilization for various sized caches for motion compensation of a multimedia SoC in accordance with aspects of the present invention.

As illustrated in the figure, graph 800 includes a Y-axis 802, an X-axis 804, a line 806, a line 808, a line 810, and a line 812.

Y-axis 802 represents pixel-to-pixel ratio. X-axis 804 represents cache size.

Line 806 represents the ideal pixel-to-pixel ratio. Line 808 represents an 8 KB line cache in accordance with aspects of the present invention. Line 810 represents a conventional 32 KB line cache. Line 812 represents a conventional 64 KB line cache.

In operation, when a cache fetches data from memory, the amount of data fetched is equal the line size of the cache. A cache in accordance with aspects of the present invention has a small 8 KB line cache, so when data is fetched from memory only 8 KB is fetched at a time. Since 8 Kb is a small line size, very little memory bandwidth is utilized as shown by line 808.

A conventional 32 KB line cache is much larger, and every time data is fetched from memory, 32 KB must be fetched. Fetching 32 KB of data from memory utilizes a lot of the memories bandwidth as shown by line 810, which creates latency. A conventional 64 KB line requires 64 KB of data to be fetched per call to the memory. A 64 KB cache utilizes a large portion of the memories bandwidth as shown by line 812.

A problem with the conventional system and method for processing data using a multimedia SoC is cross thrashing between multiple processing components. Multiple processing components using a common cache leads to one processing component over writing the data of another component stored in cache every time a cache miss occurs. This leads to each processing component continually fetching data from the main memory and then over writing stored data in the cache.

Overwriting data in the cache forces each processing component to fetch data from the main memory. Fetching data from the main memory utilizes limited bandwidth of the main memory, creating a bottle neck. As the traffic of the main memory increases, processing components have to wait to fetch data increasing latency and decreasing throughput.

The present invention presents a system and method for using a qualifier based splitter, configurable cache, and arbiter to fetch and store data from the main memory of an SoC. The qualifier based splitter routes traffic from each processing component to a configurable cache when data needs to be fetched. If the configurable cache holds the requested data, it can simply be read from its location within the configurable cache. If the configurable cache does not hold the request data, the request for data is forwarded to an arbiter where the data is fetched from the main memory of the SoC. The data is then written to the configurable cache where it can be fetched at a later time.

If a processing component begins to experience latency or decreased throughput, the configurable cache can be dynamically configured to improve performance by either enabling or disabling data prefetching, changing the data replacement policy, or changing the write mode of the configurable cache. Additionally, more than one configurable cache can be used in the SoC to further improve latency and throughput.

The qualifier based splitter may also be dynamically configured to improve data the routing of data requests from processing components to a configurable cache. The qualifier based splitter may additionally route data requests that are not cache friendly directly to the arbiter, which will then fetch the data from the main memory. Routing data requests that are not cache friendly directly to the main memory further decreases latency and increases throughput.

Using a qualifier based splitter and configurable cache significantly reduces the number of times data needs to be fetched from the main memory. The decreased traffic of the main memory reduces the utilized bandwidth, eliminating bottle necks. In this manner, data that must be fetched from the main memory, such as data that is not cache friendly, can be fetched from the main memory in a timely manner due to the large amount of memory bandwidth that is available.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A system comprising:
    a first data processing component operable to generate a first request for a first portion of data at a first location within a memory;
    a second data processing component operable to generate a second request for a second portion of data at a second location within the memory;
    a qualifier based splitter component operable to route the first request and the second request based on a qualifier;
    a first configurable cache element operable to perform one of an enable or a disable of prefetching data within a first region of the memory;
    a second configurable cache element operable to perform one of an enable or a disable of prefetching data within a second region of the memory; and
    an arbiter component operable to route the first request and to route the second request to the memory.
2. The system of claim 1, further comprising:
    a bypass path,
    wherein said qualifier based splitter component is further operable to route the first request, via said bypass path so as to bypass said first configurable cache element, to said arbiter component.
3. The system of claim 2,
    wherein said first configurable cache element comprises a write back, pre-fetch disabled, cache element, and
    wherein said second configurable cache element comprises a write through, pre-fetch disabled, cache element.
4. The system of claim 3, further comprising a third configurable cache element operable to perform one of an enable or a disable of prefetching data within a third region of the memory.
5. The system of claim 4, wherein said third configurable cache element comprises a pre-fetch enabled cache element.
6. The system of claim 5, wherein said qualifier based splitter component is operable to route the first request and the second request based on one of the group consisting of address range, type of transaction, master identifier, and combinations thereof.
7. The system of claim 6, wherein said first configurable cache element comprises a configurable cache replacement policy.

8. The system of claim 7, wherein said arbiter component is operable to route the first request to a first memory and to route the second request to a second memory based on a load sharing policy.
9. The system of claim 1,
    wherein said first configurable cache element comprises a write back, pre-fetch disabled, cache element, and
    wherein said second configurable cache element comprises a write through, pre-fetch disabled, cache element.
10. The system of claim 1, wherein said qualifier based splitter component is operable to route the first request and the second request based on one of the group consisting of address range, type of transaction, master identifier, and combinations thereof.
11. A method comprising:
    generating, via a first data processing component, a first request for a first portion of data at a first location within a memory;
    generating, via a second data processing component, a second request for a second portion of data at a second location within the memory;
    routing, via a qualifier based splitter component, the first request based on a qualifier;
    routing, via the qualifier based splitter component, the second request based on the qualifier;
    performing, via a first configurable cache element, one of an enable or a disable of prefetching data within a first region of the memory;
    performing, via a second configurable cache element, one of an enable or a disable of prefetching data within a second region of the memory;
    routing, via an arbiter component, the first request; and
    routing, via the arbiter component, the second request.
12. The method of claim 11, further comprising routing, via the qualifier based splitter component, route the first request, via a bypass path so as to bypass the first configurable cache element, to the arbiter component.
13. The method of claim 12,
    wherein said performing, via a first configurable cache element, one of an enable or a disable of prefetching data within a first region of the memory comprises performing one of an enable or a disable of prefetching data via a write back, pre-fetch disabled, cache element, and
    wherein performing, via a second configurable cache element, one of an enable or a disable of prefetching data within a second region of the memory comprises performing one of an enable or a disable of prefetching data via a write through, pre-fetch disabled, cache element.
14. The method of claim 13, further comprising performing, via a third configurable cache element, one of an enable or a disable of prefetching data within a third region of the memory.
15. The method of claim 14, wherein said performing, via a third configurable cache element, one of an enable or a disable of prefetching data within a third region of the memory comprises performing one of an enable or a disable of prefetching data via a pre-fetch enabled cache element.
16. The method of claim 15, wherein said routing, via a qualifier based splitter component, the first request based on a qualifier comprises routing the first request based on one of the group consisting of address range, type of transaction, master identifier, and combinations thereof.
17. The method of claim 16, wherein said performing, via a first configurable cache element, one of an enable or a disable of prefetching data within a first region of the memory comprises performing one of an enable or a disable of prefetching data via a cache element having a least recently fetched cache replacement policy.

18. The method of claim 17,
- wherein said routing, via an arbiter component, the first request comprises routing the first request to a first memory based on a load sharing policy, and
- wherein said routing, via the arbiter component, the second request comprises routing the second request to a second memory based on the load sharing policy.

19. The method of claim 11,
- wherein said performing, via a first configurable cache element, one of an enable or a disable of prefetching data within a first region of the memory comprises performing one of an enable or a disable of prefetching data via a write back, pre-fetch disabled, cache element, and
- wherein performing, via a second configurable cache element, one of an enable or a disable of prefetching data within a second region of the memory comprises performing one of an enable or a disable of prefetching data via a write through, pre-fetch disabled, cache element.

20. The method of claim 11, wherein said routing, via a qualifier based splitter component, the first request based on a qualifier comprises routing the first request based on one of the group consisting of address range, type of transaction, master identifier, and combinations thereof.

* * * * *